United States Patent
Tsunehara et al.

(10) Patent No.: US 6,990,351 B2
(45) Date of Patent: Jan. 24, 2006

(54) EQUIPMENT FOR THE CALCULATION OF MOBILE HANDSET POSITION

(75) Inventors: Katsuhiko Tsunehara, Hachioji (JP); Mikio Kuwahara, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 520 days.

(21) Appl. No.: 10/076,664

(22) Filed: Feb. 19, 2002

(65) Prior Publication Data

US 2003/0003923 A1 Jan. 2, 2003

(30) Foreign Application Priority Data

Feb. 19, 2001 (JP) ........................ 2001-041123

(51) Int. Cl.
*H04Q 7/20* (2006.01)
*G01S 5/02* (2006.01)

(52) U.S. Cl. ............... 455/456.1; 455/456.3; 455/456.6; 342/357.11; 701/214

(58) Field of Classification Search ... 455/456.1–456.7, 455/414.1, 457; 701/213, 214; 342/357.1, 342/457, 357.09
See application file for complete search history.

(56) References Cited

U.S. PATENT DOCUMENTS

| | | | | |
|---|---|---|---|---|
| 6,097,958 A | * | 8/2000 | Bergen | 455/456.2 |
| 6,385,458 B1 | * | 5/2002 | Papadimitriou et al. | 455/456.2 |
| 6,484,034 B1 | * | 11/2002 | Tsunehara et al. | 455/456.6 |
| 6,697,629 B1 | * | 2/2004 | Grilli et al. | 455/456.1 |
| 2004/0172190 A1 | * | 9/2004 | Tsunehara et al. | 701/207 |

FOREIGN PATENT DOCUMENTS

| | | | |
|---|---|---|---|
| EP | 1 452 887 A2 | * | 9/2004 |
| GB | 2 215 932 A | * | 9/1989 |
| JP | 07-181242 | | 12/1993 |
| JP | 410271554 A | * | 10/1998 |
| JP | 2000-356672 | | 6/1999 |
| JP | 2002-243827 A | * | 8/2002 |
| JP | 2004-101254 A | * | 4/2004 |
| KR | 1999-0073743 | | 3/1998 |
| KR | 2000-0007448 | | 7/1998 |
| WO | WO 99/59373 A1 | * | 11/1999 |

* cited by examiner

Primary Examiner—Charles N. Appiah
(74) Attorney, Agent, or Firm—Reed Smith LLP; Stanley P. Fisher, Esq.; Juan Carlos A. Marquez, Esq.

(57) ABSTRACT

Even in areas where signals from only two or less base stations are available for position calculation, the mobile handset position can be calculated, expanding the position information service area and improving the usefulness. When the number of base stations available for position calculation is three or more, the position calculation is performed based on trilateration. When the number of available base stations is two or one, the position calculation is performed by using a two-station-based position calculation method or a one-station-based position calculation method according to the number of available base stations.

10 Claims, 5 Drawing Sheets

EQUIPMENT FOR THE CALCULATION OF MOBILE HANDSET POSITION

BACKGROUND OF THE INVENTION

The present invention relates to equipment for locating a current position of a mobile handset by using a radio signal.

JP-A-7-181242 discloses a method for calculating a present position of a mobile handset by using a signal of a cellular telephone. The method of locating the current position of a mobile handset as disclosed in this official gazette will be described below. The mobile handset receives signals transmitted from three cellular telephone base stations. Based on the received signals, the mobile handset calculates differences in propagation time among the signals from the three base stations. The mobile handset, using the propagation time differences, calculates the current position according to triangulation.

SUMMARY OF THE INVENTION

In areas very close to cellular phone base stations or in suburbs or mountainous regions where cellular phone base stations are few, the number of cellular phone base stations that satisfy a reception quality allowing a position measuring operation at the position of the mobile handset decreases. As a result, the number of base stations that satisfy the reception quality usable for position calculation becomes fewer than three, making it impossible to use signals from at least three base stations required for position calculation. This renders the locating of the current position of the mobile handset impossible with a conventional method using trilateration. Therefore, in areas where signals from only two or less base stations are available for position calculation, services using the position information cannot be provided.

To solve the problem described above, one aspect of the present invention provides an equipment for calculating the mobile handset position which calculates the number of base stations available for position calculation, performs the position calculation based on trilateration when the number of base stations is three or more, performs the position calculation by using a two-station-based position calculation method when the number of base stations is two, and performs the position calculation by using a one-station-based position calculation method when the number of base stations is one. According to another aspect of the present invention, the equipment controls information to be provided to the mobile handset holder according to the number of base stations available for position calculation.

A more detailed description of the position calculation method will be given later. These processing and calculations may be executed by a processor based on software or by dedicated hardware. The scope of the present invention includes procedures themselves detailed later with reference to the accompanying drawings, and hardware and software for the procedures.

Other objects, features and advantages of the invention will become apparent from the following description of the embodiments of the invention taken in conjunction with the accompanying drawings.

DETAILED DESCRIPTION OF THE EMBODIMENTS

Figure 1:
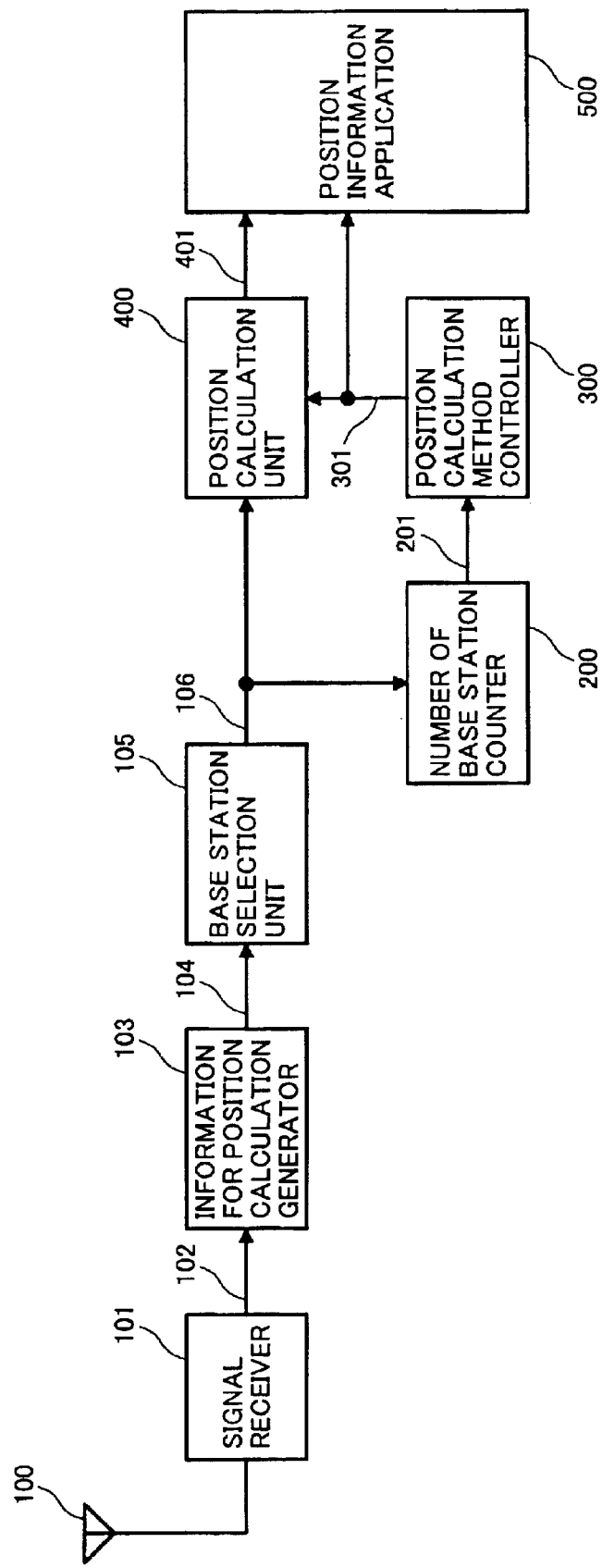
FIG. 1 is a block diagram showing a configuration of equipment implementing the present invention.

A configuration of the equipment implementing the present invention is shown in FIG. 1. A signal receiver 101 performs reception processing at a high/intermediate frequency corresponding to a cellular signal received by an antenna 100 and also demodulation processing on a base band signal to generate a cellular reception signal 102.

A position calculation information generator 103 generates, from the cellular reception signal 102, position calculation information 104 necessary for position calculation and outputs it to a base station selection unit 105. The information required for position calculation includes, for example, a reception timing of the cellular signal from base stations and a reception quality of the cellular signal from base stations. The reception timing may be determined, for example, by using a matched filter and producing a delay profile of the received signal. The reception quality of the cellular signal may be determined from a correlation value of the delay profile.

According to the position calculation information 104 received, the base station selection unit 105 selects base stations available for the position calculation and outputs position calculation information 106 on the selected base stations to a base station number counter 200 and the position calculation unit 400. For example, the method of selecting the base stations may select only those base stations whose signal-to-noise ratios of the received signals are in excess of a predetermined threshold.

The base station number counter 200 counts the number of base stations selected by the base station selection unit 105 and outputs the selected number of base stations 201 to a position calculation method controller 300.

The position calculation method controller 300 outputs to the position calculation unit 400 and a position information application unit 500 a control signal 301 that controls, according to the selected number of base stations 201, the position calculation method to be performed by the position calculation unit 400. In this embodiment, when the selected number of base stations 201 is one, the control signal 301 is set to 1; when the base station number is two, the control signal 301 is set to 2; and when the number is three or more, the control signal 301 is set to 3.

Figure 2:
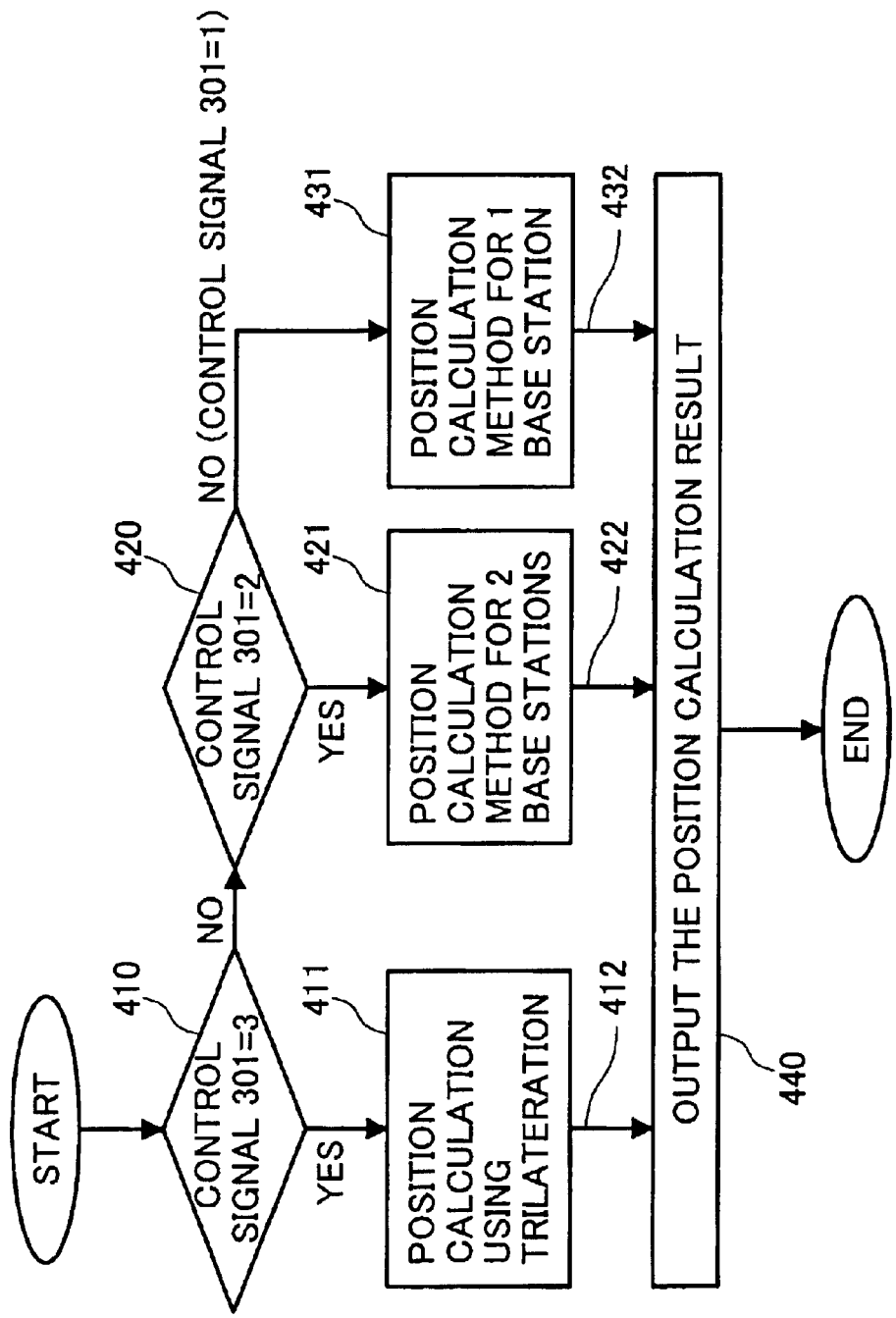
FIG. 2 is an operation flow of a position calculation unit 400.

The position calculation unit 400 selects the position calculation method according to the control signal 301, calculates the current position of a mobile handset by using the position calculation information 106 on the base stations selected by the base station selection unit 105, and outputs a position calculation result 401. The operation flow of the position calculation unit 400 will be explained by referring to FIG. 2. The position calculation unit 400 checks if the control signal 301 is "3" or not (step 410). If the control signal 301 is "3", the position calculation unit 400 performs the position calculation based on trilateration (step 411). When the control signal 301 is not "3", the position calculation unit 400 checks whether the control signal 301 is "2" (step 420). If the control signal 301 is "2", the position calculation unit 400 performs the position calculation according to a 2-station-based position calculation method (step 421). When the step 420 finds that the control signal 301 is not "2", i.e., the control signal 301 is "1", the position calculation unit 400 performs the position calculation according to a 1-station-based position calculation method (step 431). The position calculation unit 400 outputs a position calculation result 412, 422, 432 as the position calculation result 401 produced by the position calculation method selected according to the control signal 301 (step 440).

Figure 3:
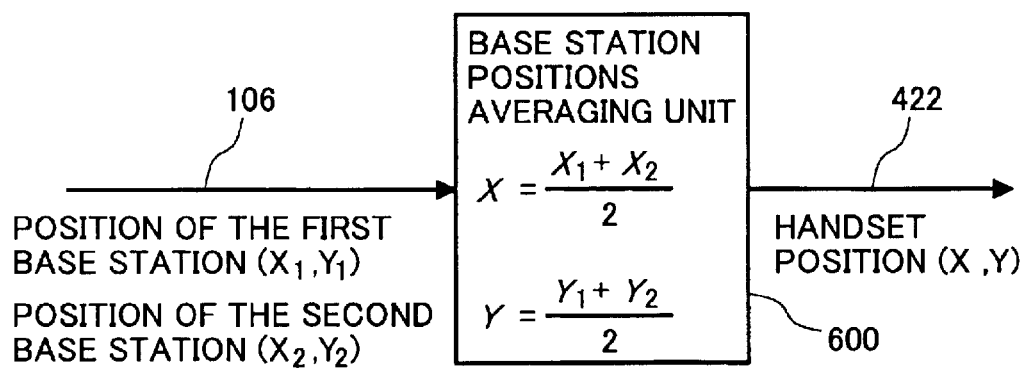
FIG. 3 illustrates a first example configuration realizing a position calculation step for two base stations 421.

FIG. 3 shows a first example configuration of the 2-station-based position calculation step-421. In this example, of the position calculation information 106 on the base stations selected by the base station selection unit 105, first and second base station positions $(X_1, Y_1)$ and $(X_2, Y_2)$ are used for position calculation. A base station positions averaging unit 600 calculates X and Y component averages of $(X_1, Y_1)$ and $(X_2, Y_2)$ and outputs them as a mobile handset position (X, Y).

Figure 4:
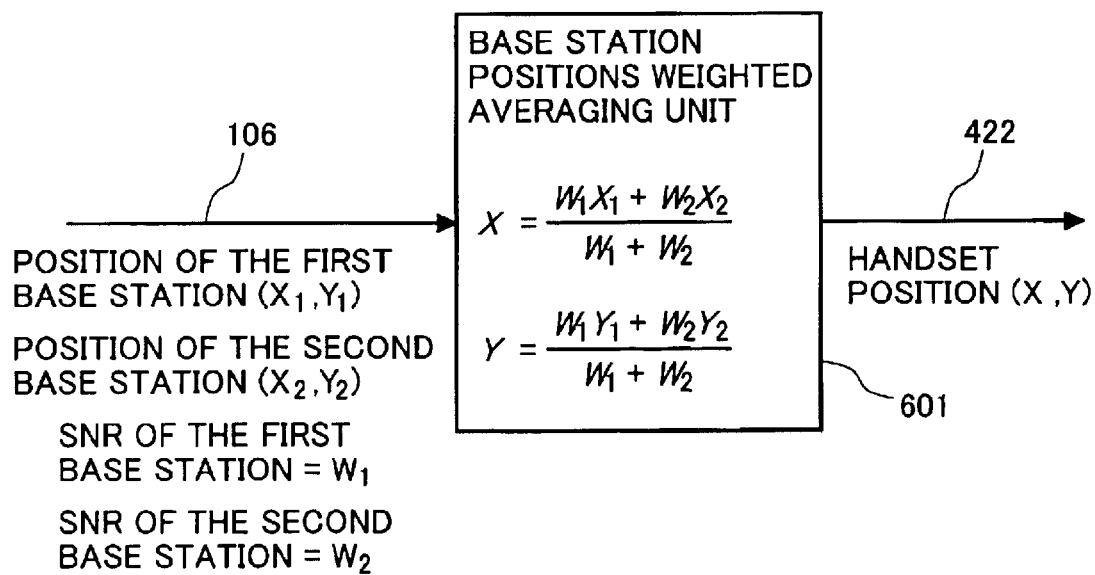
FIG. 4 illustrates a second example configuration realizing the position calculation step for two base stations 421.

FIG. 4 shows a second example configuration of the 2-station-based position calculation step 421. In this example, of the position calculation information 106 on the base stations selected by the base station selection unit 105, first and second base station positions $(X_1, Y_1)$ and $(X_2, Y_2)$ and reception qualities of signals received from the first and second base stations, $W_1$, $W_2$, are used for position calculation. In this embodiment, a signal-to-noise ratio SNR is used as the reception quality of the received signal. As another reception quality a reception power of the received signal may be used. The base station positions averaging unit 600 calculates weighted averages from the X and Y components of $(X_1, Y_1)$ and $(X_2, Y_2)$ with the reception qualities $W_1$ and $W_2$ taken as weights and outputs a mobile handset position (X, Y).

Figure 5:
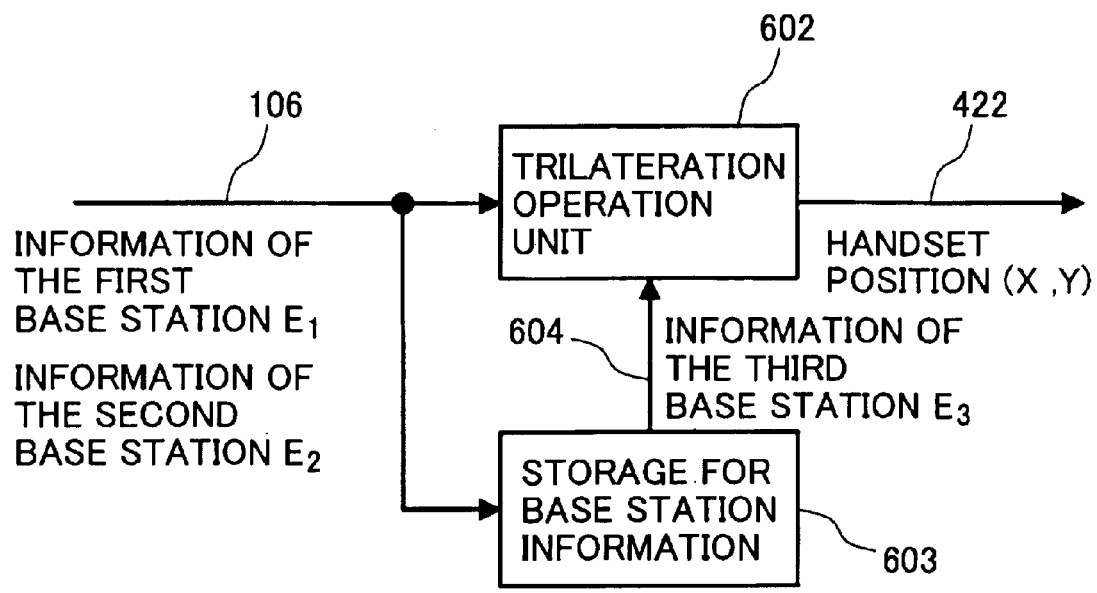
FIG. 5 illustrates a third example configuration realizing the position calculation step for two base stations 421.

FIG. 5 shows a third example configuration of the 2-station-based position calculation step 421. The position calculation information 106 on the base stations selected by the base station selection unit 105 is input to a trilateration operation unit 602 and a base station information storage 603. The base station information storage 603 holds position calculation information used in the past position calculations. In this example, the base stations selected by the base station selection unit 105 are two stations, a first base station and a second base station, which is one station short of the requirement for trilateration. Hence, the base station information storage 603 selects position calculation information 604 on a third base station, different from the first and second base stations, from among the position calculation information used in the past position calculations, and outputs the selected information to the trilateration operation unit 602. The method for selecting the third base station, for example, needs only to select a base station different from the first and second base stations from among the base stations used in the latest position calculation. When there are two or more such base stations, one with the best reception quality may be chosen. The trilateration operation unit uses the position calculation information on the first and second base stations entered from the base station selection unit 105 and the position calculation information on the third base station entered from the base station information storage 603 to perform the position calculation based on the principle of trilateration and then outputs a mobile handset position 422.

Figure 6:
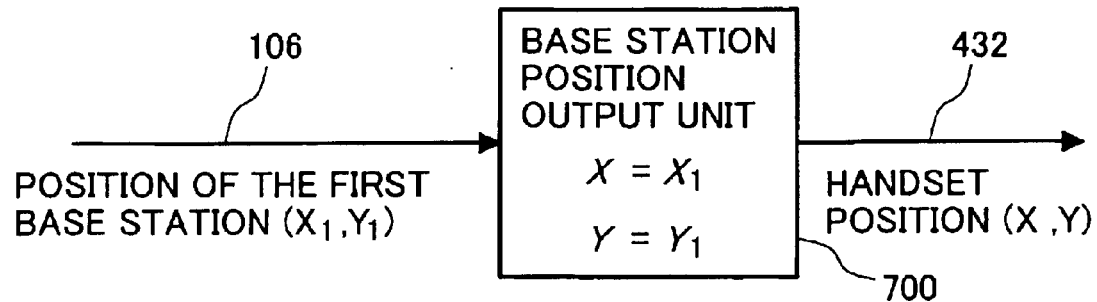
FIG. 6 illustrates a first example embodiment realizing a position calculation step for a single base station 431.

FIG. 6 shows a first example configuration of the 1-station-based position calculation step 431. In this example, of the position calculation information 106 on the first base station selected by the base station selection unit 105, the first base station position $(X_1, Y_1)$ is used for the position calculation. A base station position output unit 700 outputs the position $(X_1, Y_1)$ as the mobile handset position (X, Y).

Figure 7:
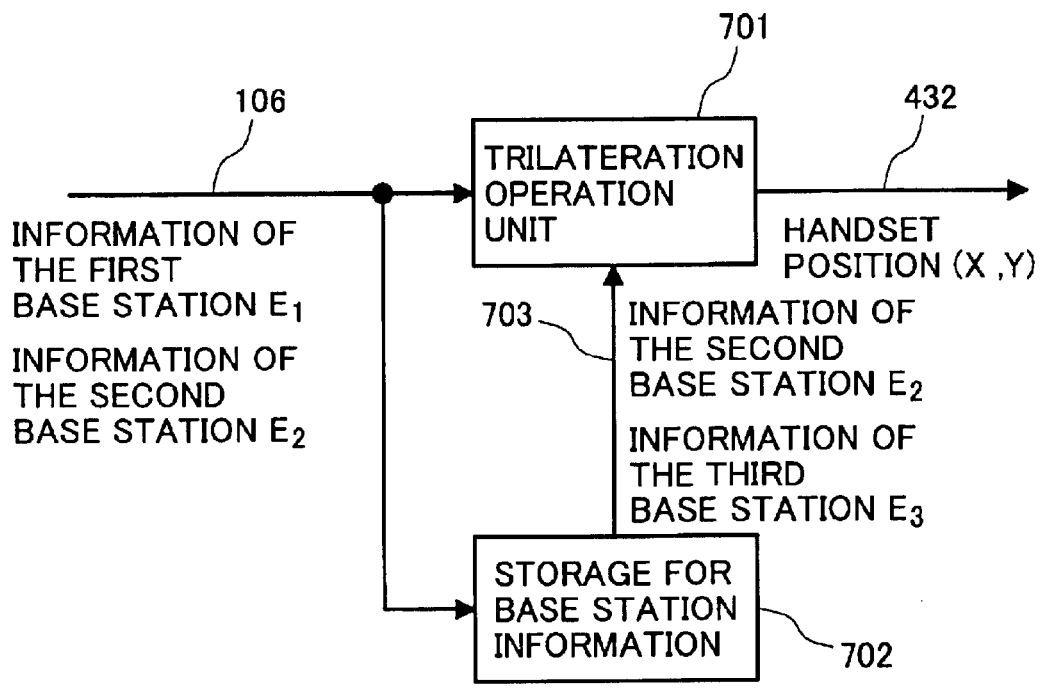
FIG. 7 illustrates a second example configuration realizing the position calculation step for a single base station 431.

FIG. 7 shows a second example configuration of the 1-station-based position calculation step 431. The position calculation information 106 on the base station selected by the base station selection unit 105 is entered into a trilateration operation unit 701 and a base station information storage 702. The base station information storage 702 holds position calculation information used in the past position calculations. In this embodiment, the base station selected by the base station selection unit 105 is only one station, a first base station, which is two stations short of the requirement for trilateration. Hence, the base station information storage 702 selects position calculation information 703 on the second and third base stations, different from the first base station, from among the position calculation information used in the past position calculations and then outputs the selected information to the trilateration operation unit 701. The method for selecting the second and third base stations, for example, needs only to select two base stations different from the first base station from among the base stations used in the latest position calculation. When there are two or more such base stations, two with the best reception qualities may be chosen. The trilateration operation unit uses the position calculation information on the first base station entered from the base station selection unit 105 and the position calculation information on the second and third base stations entered from the base station information storage 702 to perform the position calculation based on the principle of trilateration and then outputs a mobile handset position 432.

The position information application unit 500 uses the received position calculation result 401 and control signal 301 to provide a mobile handset holder with services using position information, such as offering nearby store information and route guidance.

Figure 8:
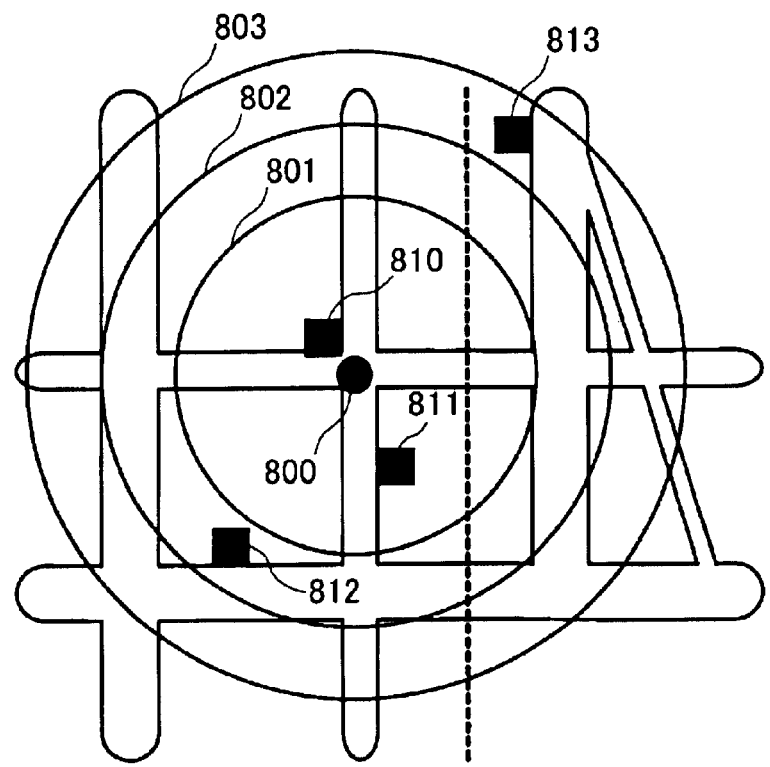
FIG. 8 illustrates an operation of a position information application unit 500.

FIG. 8 shows an operation of the position information application unit 500 when it provides the nearby store information as the service using position information. It is assumed that the position calculation result 401 represents a position 800 as a current position. First, a case where the control signal 301 is "3" will be explained. In this case, the number of base stations used in the position calculation is three or more and the accuracy of the position calculation result 401 is considered good. The position information application unit 500 provides the mobile handset holder with information on stores 810 and 811 in an area 801 as the nearby store information. Next, a case in which the control signal 301 is "2" will be explained. In this case, the number of base stations used in the position calculation is two and the accuracy of the position calculation result 401 is considered worse than that when the control signal 301 is "3". In this case, the position information application unit 500 provides the mobile handset holder with information on stores 810, 811 and 812 in an area 802 wider than the area 801 as the nearby store information. Finally, a case where the control signal 301 is "1" will be explained. In this case the number of base stations used in the position calculation is one and the accuracy of the position calculation result 401 is considered still worse than when the control signal 301 is "2". The position information application unit 500 provides the mobile handset holder with information on stores 810, 811, 812 and 813 in an area 803 wider than the area 802 as the nearby store information.

As described above, even when the position locating accuracy is poor, the position information application unit 500 can provide the mobile handset holder with the nearby store information by controlling the area for the store information being provided according to the position locating accuracy.

With this invention, even in areas where signals from only two or less base stations are available for the position calculation, the current position of the mobile handset can be determined. This makes it possible to expand the area of the position information service. Further, by controlling the information to be provided to the user according to the number of base stations used in the position calculation, it is possible to offer useful information to the user even when only one base station is available for the position calculation and the position locating accuracy is bad. The usefulness of the position information service can therefore be enhanced.

It should be further understood by those skilled in the art that the foregoing description has been made on embodiments of the invention and that various changes and modifications may be made in the invention without departing from the spirit of the invention and the scope of the appended claims.

What is claimed is:

1. Equipment for calculating a mobile handset position by using a cellular radio wave, comprising:
    a signal receiver for receiving a cellular radio wave to generate a reception signal;
    a position calculation information generator for generating position calculation information necessary for position calculation by using the reception signal;
    a base station selection unit for selecting base stations available for position calculation according to the position calculation information;
    a base station number counter for counting the number of base stations selected by the base station selection unit;
    a position calculation method controller for generating, according to the number of selected base stations, a position calculation method control signal to control the position calculation method;
    a position calculation unit for calculating, according to the position calculation method specified by the position calculation method control signal, the mobile handset position from the position calculation information and the information on the base stations selected by the base station selection unit; and
    a position information application unit for using the mobile handset position to provide a user with information, wherein
    when the position calculation method control signal entered from the position calculation method controller corresponds to three or more base stations available for position calculation, the position calculation unit performs the position calculation based on trilateration;
    when the position calculation method control signal corresponds to two base stations available for position calculation, the position calculation unit performs the position calculation by using a two-station-based position calculation unit; and
    when the position calculation method control signal corresponds to one base station available for position calculation, the position calculation unit performs the position calculation by using a one-station-based position calculation unit.

2. Equipment for calculating a mobile handset position according to claim 1, wherein the two-station-based position calculation unit has a base station positions averaging unit that calculates an average of positions of the two base stations available for position calculations and outputs the average as a position of the mobile hand set.

3. Equipment for calculating a mobile handset position according to claim 1, wherein the two-station-based position calculation unit has a base station positions weighted averaging unit that calculates an average of positions, weighted by a weight of each base station, of the two base stations available for position calculations and outputs the weighted average as a position of the mobile hand set.

4. Equipment for calculating a mobile handset position according to claim 3, wherein the weighted averaging unit uses a function using a signal-to-noise ratio of the reception signal from each base station as a weight.

5. Equipment for calculating a mobile handset position according to claim 3, wherein the weighted averaging unit uses a received power of the reception signal from each base station as a weight.

6. Equipment for calculating a mobile handset position according to claim 1, wherein the two-station-based position calculation unit has:
    a base station information storage which holds the position calculation information and selects and outputs, from among the base stations used in past position calculations, position calculation information on a third base station different from first and second base stations selected by the base station selection unit; and
    a trilateration operation unit which performs the position calculation based on trilateration by using the position calculation information on the first, second and third base stations.

7. Equipment for calculating a mobile handset position according to claim 1, wherein the one-station-based position calculation unit has a base station position output unit which outputs a position of one base station available for position calculation as the mobile handset position.

8. Equipment for calculating a mobile handset position according to claim 1, wherein the one-station-based position calculation unit has:
    a base station information storage which holds the position calculation information and selects and outputs, from among the base stations used in past position calculations, position calculation information on second and third base stations different from a first base station selected by the base station selection unit; and
    a trilateration operation unit which performs the position calculation based on trilateration by using the position calculation information on the first, second and third base stations.

9. Equipment for calculating a mobile handset position by using a cellular radio wave, comprising:
    a signal receiver for receiving a cellular radio wave to generate a reception signal;
    a position calculation information generator for generating position calculation information necessary for position calculation by using the reception signal;
    a base station selection unit for selecting base stations available for position calculation according to the position calculation information;
    a base station number counter for counting the number of base stations selected by the base station selection unit;

a position calculation method controller for generating, according to the number of selected base stations, a position calculation method control signal to control the position calculation method;

a position calculation unit for calculating, according to the position calculation method specified by the position calculation method control signal, the mobile handset position from the position calculation information and the information on the base stations selected by the base station selection unit; and a position information application unit for using the mobile handset position to provide a user with information, wherein the position information application unit controls information to be provided to the user in addition to the mobile handset position according to the number of base stations selected by the base station selection unit.

10. A method for calculating a mobile handset position by using a cellular radio wave, comprising the steps of:

receiving a cellular radio wave to generate a reception signal;

generating position calculation information necessary for position calculation by using the reception signal;

selecting base stations available for position calculation according to the position calculation information;

counting the number of base stations available for the position calculation and, according to the number of available base stations, generating a position calculation method control signal to control a position calculation method; and calculating, according to the position calculation method specified by the position calculation method control signal, the mobile handset position from the position calculation information and the information on the base stations selected by the base station selection unit wherein when the position calculation method control signal corresponds to three or more base stations available for position calculation, the position calculation is performed based on trilateration;

when the position calculation method control signal corresponds to two base stations available for position calculation, the position calculation is performed by using a two-station-based position calculation method; and when the position calculation method control signal corresponds to one base station available for position calculation, the position calculation is performed by using a one-station-based position calculation method.

* * * * *